(12) United States Patent
Schmidt

(10) Patent No.: US 6,792,483 B2
(45) Date of Patent: *Sep. 14, 2004

(54) I/O GENERATION RESPONSIVE TO A WORKLOAD HEURISTICS ALGORITHM

(75) Inventor: Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 09/966,199

(22) Filed: Sep. 28, 2001

(65) Prior Publication Data
US 2003/0079067 A1 Apr. 24, 2003

(51) Int. Cl.[7] .............................. G06F 3/00; G06F 13/00
(52) U.S. Cl. .............................. 710/48; 710/46; 710/47; 710/260; 709/102; 709/105
(58) Field of Search .............................. 710/46, 47, 48, 710/260; 709/102, 105

(56) References Cited

U.S. PATENT DOCUMENTS

| | | | |
|---|---|---|---|
| 4,024,505 A | * | 5/1977 | Sperling .......................... 710/2 |
| 4,447,873 A | | 5/1984 | Price et al. ................... 364/200 |
| 4,638,424 A | * | 1/1987 | Beglin et al. ................ 711/117 |
| 5,506,987 A | * | 4/1996 | Abramson et al. ........... 709/103 |
| 5,588,125 A | | 12/1996 | Bennett ........................ 395/306 |
| 5,671,365 A | | 9/1997 | Binford et al. ............... 395/280 |
| 5,771,387 A | | 6/1998 | Young et al. ................ 395/733 |
| 5,875,343 A | | 2/1999 | Binford et al. ............... 395/736 |
| 5,881,296 A | | 3/1999 | Williams et al. ............. 395/736 |
| 5,894,583 A | * | 4/1999 | Johnson et al. ................ 710/48 |
| 6,032,217 A | | 2/2000 | Arnott .......................... 710/200 |
| 6,085,277 A | | 7/2000 | Nordstrom et al. .......... 710/263 |
| 6,430,593 B1 | * | 8/2002 | Lindsley ....................... 718/103 |
| 6,549,981 B2 | * | 4/2003 | McDonald et al. .......... 711/114 |

* cited by examiner

Primary Examiner—Rehana Perveen
(74) Attorney, Agent, or Firm—John E. Campbell; Floyd A. Gonzalez

(57) ABSTRACT

An apparatus, method and program product for use with a data processing system having a processor handling an I/O request in an I/O operation, main storage controlled by said processor for storing data, one or more I/O devices for sending data to or receiving data from said main storage in the I/O operation, and a summary register for registering I/O requests by any one or more of said devices. The apparatus includes a dispatcher for polling said summary register to determine if an I/O request is outstanding. A program in the dispatcher calculates a delay value responsive to the workload of the processor in handling I/O requests. An adapter between the device and the processor drives an interrupt of the processor if the calculated time delay is exceeded between completing I/O requests.

28 Claims, 9 Drawing Sheets

I/O GENERATION RESPONSIVE TO A WORKLOAD HEURISTICS ALGORITHM

CROSS-REFERENCE TO RELATED APPLICATIONS

The present application is related to the following copending applications:

application Ser. No. 09/966,272 for INITIATIVE PASSING IN AN I/O OPERATION WITHOUT THE OVERHEAD OF AN INTERRUPT;

application Ser. No. 09/966,232 for INTELLIGENT INTERRUPT WITH HYPERVISOR COLLABORATION; and application Ser. No. 09/966,633 for LOW OVERHEAD I/O INTERRUPT.

FIELD OF THE INVENTION

The present invention relates to communications between processes in a multiprocessor system, and more particularly relates to providing a heuristics algorithm for calculating delays in the implementation of initiative passing in an input/output (I/O) operation without interrupt overhead.

BACKGROUND OF THE INVENTION

U.S. Pat. No. 4,447,873 issued May 8, 1984 to Price et al. for INPUT-OUTPUT BUFFERS FOR A DIGITAL SIGNAL PROCESSING SYSTEM discloses buffer interfaces wherein a storage controller which generates control signals indicating when it is in a condition to receive a vector of data words from the storage controller, whereon the storage controller transfers a vector of data to the input buffer.

U.S. Pat. No. 5,671,365 issued Sep. 23, 1997 to Binford et al. for I/O SYSTEM FOR REDUCING MAIN PROCESSOR OVERHEAD IN INITIATING I/O REQUESTS AND SERVICING I/O COMPLETION EVENTS, and U.S. Pat. No. 5,875,343 issued Feb. 23, 1999 to Binford et al. for EMPLOYING REQUEST QUEUES AND COMPLETION QUEUES BETWEEN MAIN PROCESSORS AND I/O PROCESSORS WHEREIN A MAIN PROCESSOR IS INTERRUPTED WHEN A CERTAIN NUMBER OF COMPLETION MESSAGES ARE PRESENT IN ITS COMPLETION QUEUE disclose an apparatus wherein I/O requests are queued in a memory shared by one or more main processing units and one or more I/O processors. Each I/O processor is associated with a queue, and each main processing unit is associated with a queue shared with the I/O processors. Each I/O processor may continue processing queued I/O requests after completing processing an earlier request. A threshold value indicates the minimum number of completed I/O requests required before an interrupt request is generated to the main processing unit. Many events are batched together under one interruption.

U.S. Pat. No. 5,771,387 issued Jun. 23,1998 to Young et al. for METHOD AND APPARATUS FOR INTERRUPTING A PROCESSOR BY A PCI PERIPHERAL ACROSS AN HIERARCHY OF PCI BUSES discloses a hierarchy of PCI buses for facilitating PCI agents coupled to the lower lever PCI buses to interrupt a processor during operation.

U.S. Pat. No. 6,032,217 issued Feb. 29, 2000 to Arnott for METHOD FOR RECONFIGURING CONTAINERS WITHOUT SHUTTING DOWN THE SYSTEM AND WITH MINIMAL INTERRUPTION TO ON-LINE PROCESSING discloses a method for concurrently reorganizing a disk file system while continuing to process I/O requests. The method includes stopping processing of new I/O requests by queuing them within the system, finishing processing I/O requests in progress, performing the reorganization, and then processing the queue of stored I/O requests before finally resuming normal operation.

U.S. Pat. No. 6,085,277 issued Jul. 4, 2000 to Nordstrom et al. for INTERRUPT AND MESSAGE BATCHING APPARATUS AND METHOD discloses an interrupt and batching apparatus for batching interrupt processing for many events together.

SUMMARY OF THE INVENTION

An apparatus, method and program product for use with a data processing system having a processor handling an J/O request in an I/O operation, main storage controlled by said processor for storing data, one or more I/O devices for sending data to or receiving data from said main storage in the I/O operation, and a summary register for registering I/O requests by any one or more of said devices. The apparatus includes a dispatcher for polling said summary register to determine if an I/O request is outstanding. A program in the dispatcher calculates a delay value responsive to the workload of the processor in handling I/O requests. An adapter between the device and the processor drives an interrupt of the processor if the calculated time delay is exceeded between completing I/O requests.

Certain workloads may incur undesirable latency using a given time delay to determine when to drive an interrupt due to a design point to not generate interrupts until a subsequent completion occurs, after the delay value has been exceeded, for example, if such a subsequent completion never occurs. In this case, a last resort timer is required for the pending completion notice(s) to be processed. Given that this timer is relatively infrequent relative to the processing of an I/O interrupt, undesirable latency will be incurred.

It is thus an object of the present invention to provide shorter I/O completion latencies for workloads comprised of a single user, request/response application which is the only application running on a target Operating System (OS) image.

It is another object of the present invention to provide workload heuristics used to detect I/O completion patterns and take the appropriate action. The action taken would be to dynamically change the OS specified delay value to/from zero. Specifying a delay value of zero tells the device to generate an interrupt upon every I/O completion.

It is another object of the invention which, when the heuristics have determined that the target delay interval is consistently not being met, the OS would change the delay value to zero.

It is another object of the invention which, when the target interval is consistently being met, the OS would change the delay value to nonzero, thereby allowing interrupts to be amortized across multiple completions.

It is another object of the invention to provide a heuristics algorithm which includes maintaining the average delay that was incurred from the time a global summary byte is set by an adapter, to the time it is reset by the dispatcher. This average would be calculated every X number of global summary byte resets. At that time, a decision would be made as to whether or not the target interval, on average, was being met, so the appropriate action could be taken.

It is another object of the invention to provide the keeping of additional information to both avoid thrashing between zero and nonzero values, and to postpone probe activity (i.e. change from zero to nonzero delay values) when previous attempts have consistently failed.

BRIEF DESCRIPTION OF THE DRAWINGS

The present invention is illustrated in the following drawings in which.

DESCRIPTION OF THE PREFERRED EMBODIMENT

Figure 1:
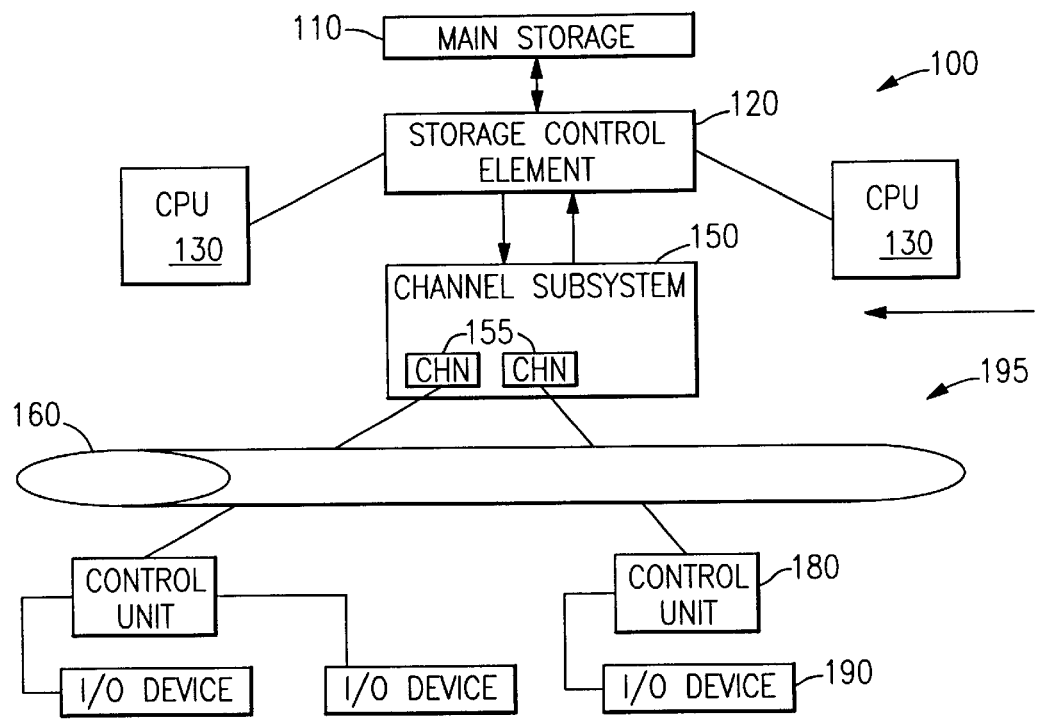
FIG. 1 is a schematic diagram of a network computing environment utilizing a channel subsystem usable with the present invention.

An example of an existing data processing system architecture is depicted in FIG. 1. As shown in FIG. 1, information is passed between the main storage 110, and one or more input/output devices (hereinafter I/O devices) 190, using channel subsystems 150. It will be understood that I/O devices as used herein refers to physical external I/O devices as well as virtual devices such as when data is transferred from one partition to another in an I/O manner and in which one partition appears as an I/O device to the other partition. In one embodiment, channel paths are established through the switch 160, the channel path comprising channels 155 and one or more control units shown at 180. These channel paths are the communication links established between the I/O devices 190 and the main storage for processing and exchange of information.

The main storage 110 stores data and programs which are input from I/O devices 190. Main storage is directly addressable and provides for high speed processing of data by central processing units and one or more I/O devices. One example of a main storage is a customer's storage area and a hardware system area (HSA) to be discussed later. I/O devices 190 pass information to or from main storage via facilities provided in the channel subsystem 250. Some examples of I/O devices include card readers and punches, magnetic-tape units, direct-access storage devices (DASD), displays, keyboards, printers, teleprocessing devices, communication controllers and sensor-based equipment.

The main storage is coupled to the storage control element (SCE) 120 which in turn is coupled to one or more central processing units (CPU) 130. The central processing unit(s) is the control center of the data processing system and typically comprises sequencing and processing facilities for instruction execution, initial program loading and other related functions. The CPU is usually coupled to the SCE via a bi-directional or unidirectional bus. The SCE, which controls the execution and queuing of requests made by the CPU and channel subsystem, is coupled to the main storage, CPUs and the channel subsystem via different busses.

The channel subsystem directs the flow of information between I/O devices and main storage and relieves the CPUs of the task of communicating directly with the I/O devices so that data processing operations directed by the CPU can proceed concurrently with I/O processing operations. The channel subsystem uses one or more channel paths as the communication links in managing the flow of information to or from I/O devices. Each channel path consists of one or more channels, located within the channel subsystem, and one or more control units. In one preferred embodiment, a SAP I/O processor is also included as part of the channel subsystem.

As can be seen in FIG. 1, it is also possible to have one or more dynamic switches or even a switching fabric 195 (network of switches) included as part of the path, coupled to the channel(s) and the control unit(s). Each control unit is further attached via a bus to one or more I/O device(s).

The subchannel is the means by which the channel subsystem provides information about associated I/O devices to the central processing units; the CPUs obtain this information by executing I/O instructions. The subchannel consists of internal storage that contains information in the form of a channel command word (CCW) address, channel path identifier, device number, count, status indications, and I/O interruption subclass code, as well as information on path availability and functions pending or being performed. I/O operations are initiated with devices by executing I/O instructions that designate the subchannel associated with the device.

The execution of input/output operations is accomplished by the decoding and executing of CCWs by the channel subsystem and input/output devices. A chain of CCWs (input/output operations) is initiated when the channel transfers to the control unit the command specified by the first channel command word. During the execution of the specified chain of I/O operations, data and further commands are transferred between the channel(s) and the control unit(s).

Figure 2:
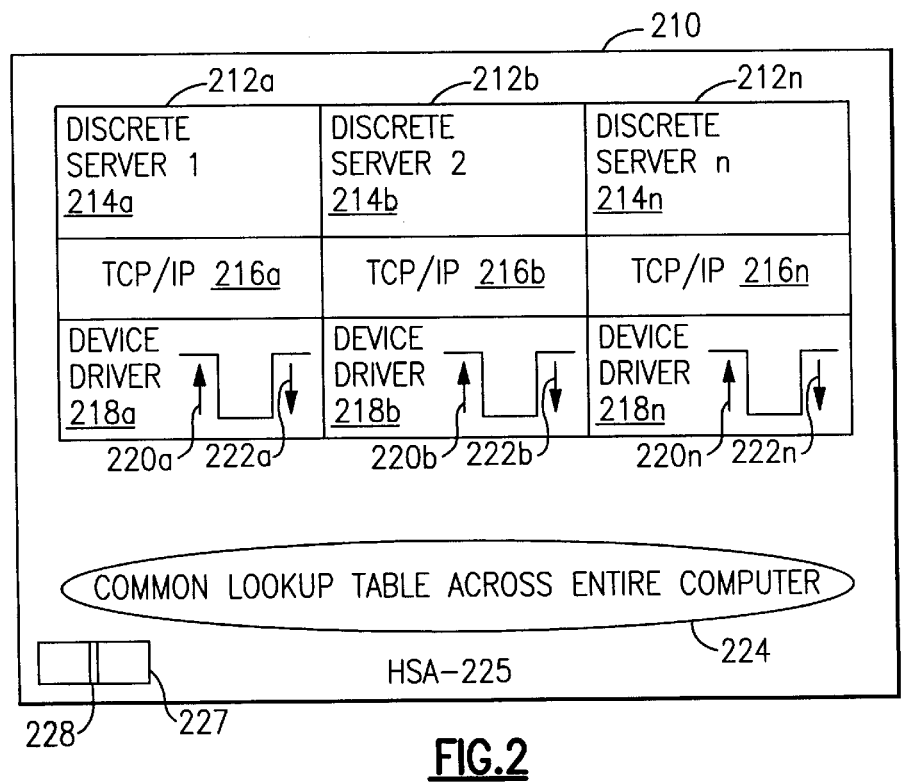
FIG. 2 is a schematic diagram of a single computer with shared physical memory and a plurality of discrete servers with a common lookup table of the present invention for transferring data from a sending-discrete server to a target-discrete server.

FIG. 2 is a schematic diagram of a single computer with shared physical memory 210, and may be an IBM z/Series z/900 computer available from International Business Machines Corporation of Armonk, New York which is a follow-on computer of the IBM S/390 computer. The computer is divided up into a number of logical partitions 212a–212n, each partition having discrete servers 214a–214n, respectively, labeled in FIG. 2 as discrete server 1 to discrete server n. Each discrete server has a TCP/IP layer 216a–216n, respectively, for handling the transmission protocols for transmitting data in Input/Output (I/O) operations for networks, as is well known. Under each TCP/IP layer 216a–216n is a device driver 218a–218n, respectively, for driving data transmissions between the discrete servers, as will be discussed.

In the present invention, each device driver is similar to device drivers which drive the devices 190 of FIG. 1. However the device drivers 218 of FIG. 2, rather than driving I/O devices, drive data exchanges between the LPAR partitions, as will be explained. Each device driver 218 has a send queue 222, and a receive or target queue 220; the send queue 222 being used for sending data from the respective discrete server 214 when that discrete server is the sending server, and the receive queue 220 for receiving data for its respective discrete server 214 when that discrete server is the target server in a send operation, as will be described in connection with FIG. 3. A common lookup table 224 is in the HSA portion 225 of the main storage 110 of the single computer 210 across the entire computer, as explained in FIG. 1. This common lookup table 224 is a centralized table defining the discrete servers 214a–214n within the computer 210 and is maintained in HSA 225 that is accessible by all the discrete servers 214a–214n. However, the discrete servers can only register in the common lookup table using I/O type commands, and cannot retrieve any information from the lookup table 224, thus maintaining security between the servers.

Each device driver 218 is associated with a subchannel control block 227 which contains control information for the subchannel. As is known, the subchannel control blocks exist in HSA 225 and are uniquely identified by a subchannel number. The subchannel control block 227 includes an internal queued direct I/O (IQDIO) indicator 228 which indicates if this subchannel is an IQDIO subchannel. The IQDIO indicator 228 may be set by the channel path identifier (CHPID) definition statement during the configuration process, as is well known in the art.

The architecture of the computer 210 of the present invention adheres to the queued direct I/O (QDIO) architecture, as explained in U.S. Pat. No. 6,397,350 B1 issued May 28, 2002 to Baskey et al. for A METHOD OF PROVIDING DIRECT DATA PROCESSING ACCESS USING A QUEUED DIRECT INPUT-OUTPUT DEVICE, owned by the assignee of the present invention and incorporated herein by reference.

Figure 3:
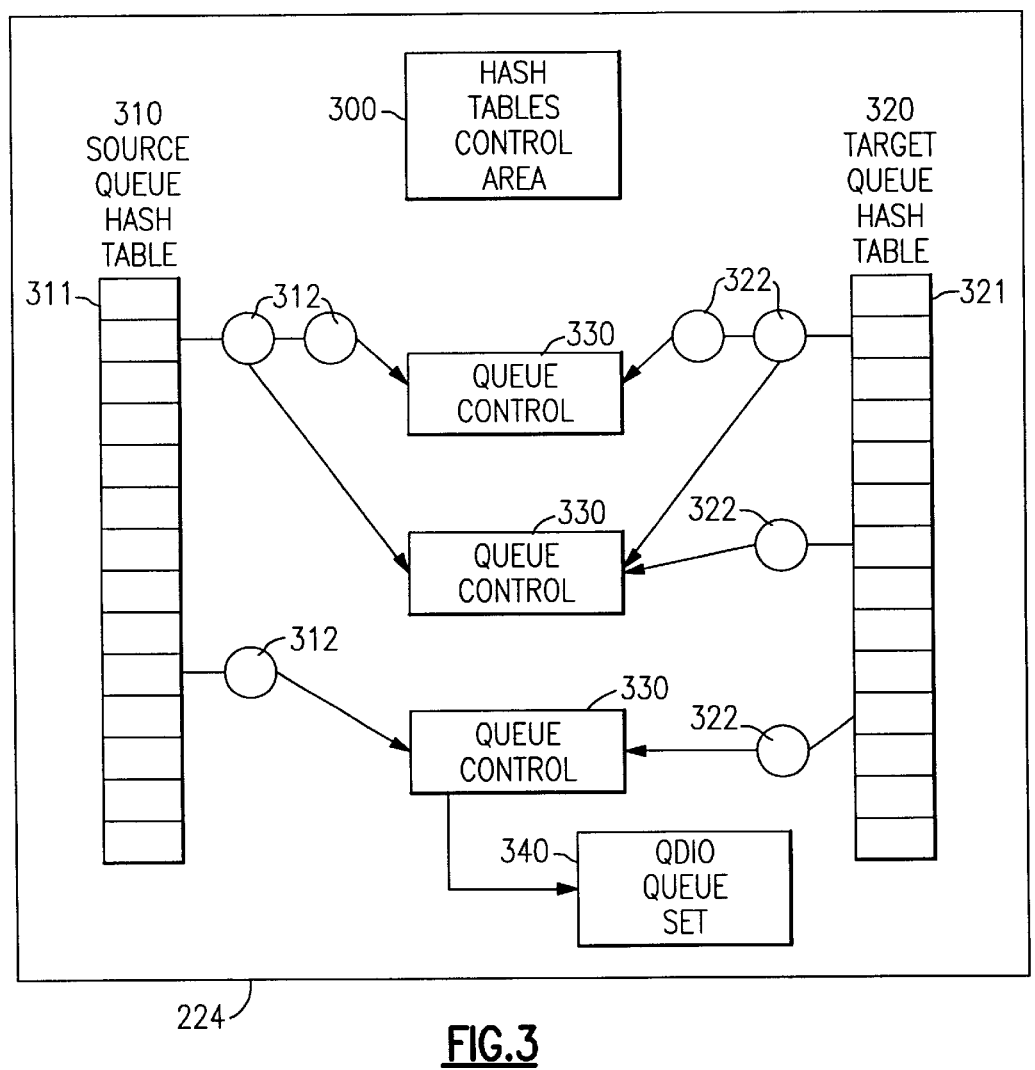
FIG. 3 is a schematic diagram illustrating the common lookup table of FIG. 2 including a hash tables control area, a source queue hash table, a target queue hash table, multiple queue controls, multiple QDIO queue sets, and means to add entries to the source queue hash table and target queue hash table.

FIG. 3 is an illustration of the common lookup table 224 of FIG. 2, and includes hash tables control area 300, a source queue hash table 310, and a target queue hash table 320. The source queue hash table includes multiple entries starting with the first entry 311, each entry acting as a source queue duplicate list head (containing a pointer to duplicate list entries 312). The target hash table 320 includes multiple entries starting with the first entry 321, each entry acting as a target queue duplicate list head (containing a pointer to duplicate list entries 322). A common queue control area 330 is shared by both send (using table 310) and receive (using table 320) processing. It will be noted that multiple 322s can point to a single 330. Each queue control 330 is linked to a QDIO queue set 340. New entries in the source queue hash table 310 are created at 312, and new entries in the target queue hash table 320 are created at 322, as will be explained.

Figure 4:
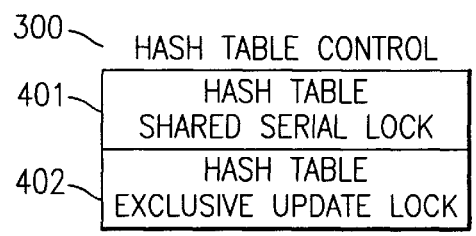
FIG. 4 is a diagram of the hash tables control area of FIG. 3.
Figure 5:
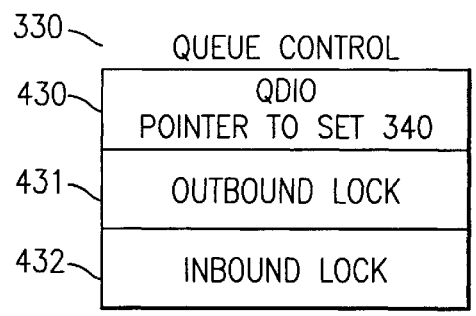
FIG. 5 is a diagram illustrating one of the queue controls of FIG. 3.

FIG. 4 is a block diagram of the hash table control 300 and includes a hash table shared serialization lock 401, and a hash table exclusive update lock 402. FIG. 5 is a block diagram of the queue control 330 and includes a QDIO pointer 430 which points to the queue set 340, an outbound lock 431, and an inbound lock 432.

Figure 6:
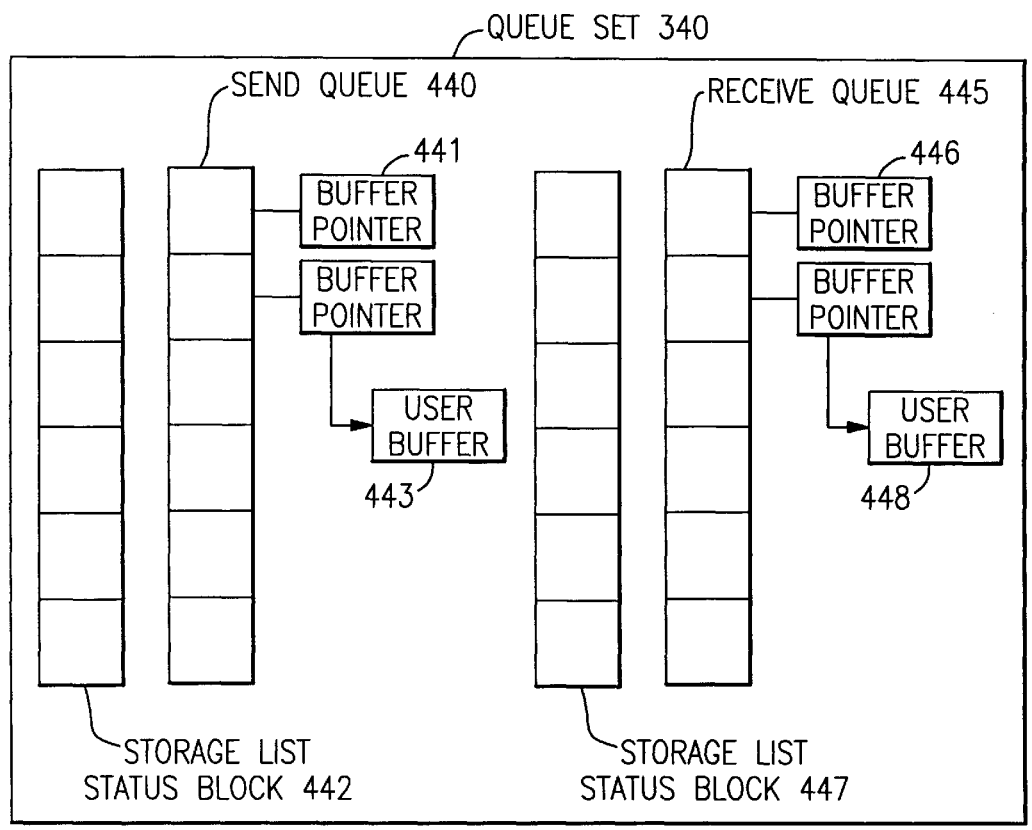
FIG. 6 is a diagram illustrating one of the queue sets of FIG. 3.
Figure 7:
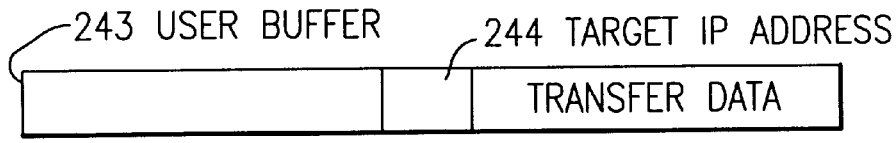
FIG. 7 is a diagram illustrating a send queue user buffer of the queue set of FIG. 6.

FIG. 6 is a block diagram of the queue set 340 of FIG. 3 and includes a send queue 440 having multiple entries, and a receive queue 445 having multiple entries. The queue set 340 also includes a storage list status block (SLSB) 442 which shows the status of each entry in the send queue 440, and a storage list status block (SLSB) 447 which shows the status of each entry in the receive queue 445. Each active entry of the send queue 440 has an associated buffer pointer 441 which points to a user buffer 443 for containing the data to be sent to the target LPAR partition. FIG. 7 is an illustration of the transfer data in the user buffer 243, and includes the target IP address 244 to which the data is to be sent. Each active entry in the receive queue 445 is associated with a buffer pointer 446 which points to a user buffer 448 which is to receive the data transferred from the user buffer 443.

Figure 8:
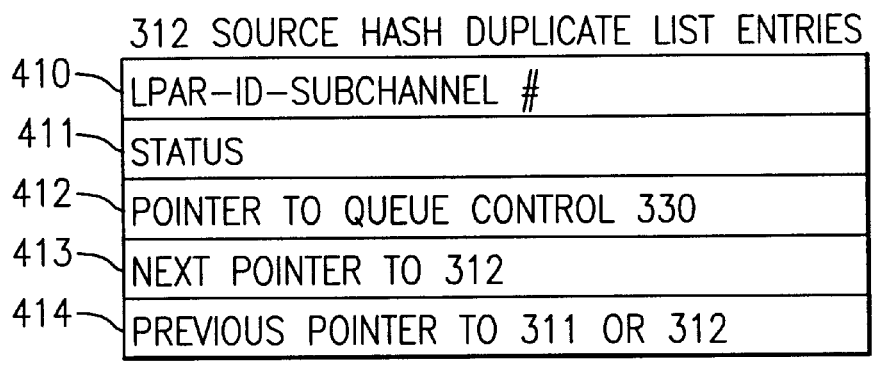
FIG. 8 is a diagram illustrating one of the entries of the source hash table of FIG. 3.
Figure 9:
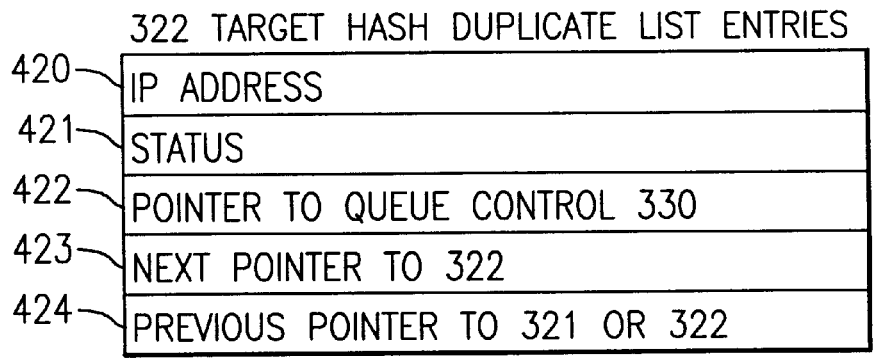
FIG. 9 is a diagram illustrating one of the entries of the target hash tables of FIG. 3.

FIG. 8 is a block diagram illustrating the entries of the source queue hash table list 310 as set up at 312. Each entry includes the LPAR-ID.SUBCHANNEL#410 used as a key to the table 311, the status 411 of the entry, the queue control pointer 412 which points to the control 330 for this entry, a next pointer 413 which points to the next entry 312 in the source hash table 310, and a previous pointer 414 which points to either the first entry 311 in the source hash table 310 or the previous entry created at 312. Similarly, FIG. 9 is a block diagram illustrating the entries of the target queue hash table as set up at 322. Each entry includes the IP address 420 used as a key to the table 321, the status 421 of the entry, a queue control pointer 422 which points to the control 330 for this entry, a next pointer 423 which points to the next entry 322 in the target hash table 320, and a previous pointer 424 which points to either the first entry 321 in the target hash table 320 or the previous entry created at 322.

The first step in transferring data from one LPAR partition to another, is to register a source or send queue 222 (represented in FIG. 2 as a downward arrow, and also shown as queue 440 in FIG. 6) and a receive or target queue 220 (represented in FIG. 2 as an upward arrow, and also shown as queue 445 in FIG. 6) for a send transaction. The registration process includes three steps: the first is to register the QDIO queue set 340 (one send queue 222 and one target queue 220) in the source queue hash table 310; the second is to associate one or more IP addresses with the previously defined QDIO set 340 by adding entries to the target queue hash table 320; and the third is to define the I/O completion vector polling bytes (620a, 615a, and 612 to be discussed in connection with FIG. 10) that are to be used to pass initiative to the target. As each QDIO queue set 340 contains both a send queue 222 and a receive queue 220, both types of hash entries resolve into a single queue control structure 330 that contains a pointer to the QDIO defined queues The source queue hash table registration is as follows:
a. Obtain the exclusive update lock 402 for the hash tables. Updates to both types of hash tables can be serialized with a single lock.
b. Using the LPAR-ID.SUBCHANNEL# as key into the source hash table 310, determine the appropriate duplicate list header location 311 in the source queue hash table 310.

c. Once found, use the pointers 413 and 414 in a well known fashion to scan all hash key duplicate entries for an exact match with the LPAR-ID.SUBCHANNEL# being added. If found, then return the Duplicate Found error return to the TCP stack for the error to be dealt with there.

d. If there are no duplicates, at 312, add an entry to the source queue hash table 310.

e. Create the queue control 330 that is to be associated with the newly created entry.

f. Release the exclusive update lock 402 for the hash tables.

The target queue hash table registration is as follows:

a. Obtain exclusive lock 402 for the hash tables. Again, updates to both types of hash tables can be serialized with a single lock.

b. Using the target IP address as the key, determine the appropriate duplicate list header location in the target queue hash table 321.

c. Once found, use the pointers 423 and 424 in a well known fashion to scan all hash key duplicates for an exact match with the target IP addresses being added. If a duplicate is found, then return a Duplicate Found error to the TCP stack for the error to be handled there.

d. If no duplicates are found, at 322, add an entry to the target queue hash table 321.

e. Using the LPAR-ID.SUBCHANNEL# from the input, perform a search of the source queue hash table 310 to find the previously defined queue control 330 that is to be associated with the newly created entry. The control 330 contains the addresses to the I/O completion vector polling bytes (620a, 615a, and 612) that are used to pass initiative to the target.

f. Release the exclusive update lock 402 for the hash tables.

Figure 10:
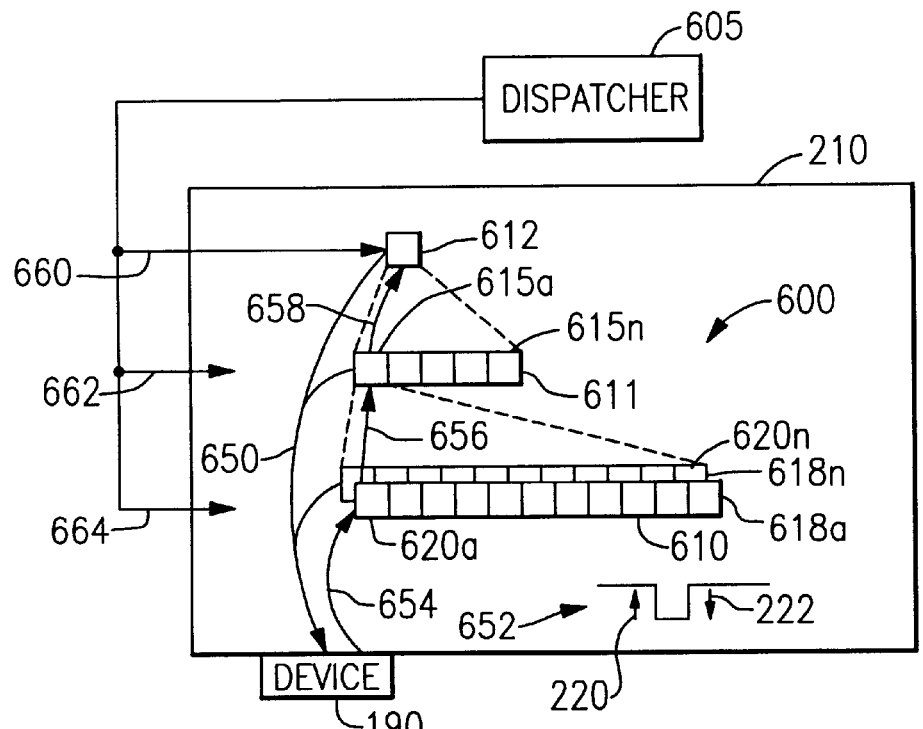
FIG. 10 is an illustration of a three tier hierarchy of I/O completion vectors.

A send operation to send data from one LPAR partition to another is as follows:

a. As part of the processing of a socket API, the device driver 218 (software) modifies the send queue 440 (shown as downward arrow 222 in FIG. 2) to prime it with data to be transferred.

b. A send is initiated by a SIGA instruction to the device driver 218. This SIGA instruction explained in the aforementioned Ser. No. 09/253,246 application includes the subchannel number associated with the send queue 222.

c. The IQDIO indicator 228 of the subchannel control block 227 for the designated subchannel indicates that this is a IQDIO subchannel and that the send operation is to use the queue set 340 associated with this subchannel.

d. The shared serialization lock 401 is obtained for the queue lookup table 224 access.

e. The LPAR-ID from which the SIGA instruction is issued and the subchannel number in the instruction is used to build the LPAR-ID.SUBCHANNEL# key into the source hash table 310.

f. Obtain the outbound lock 431 to obtain exclusive serialization of the queue control 130 for the located entry in the source hash table 310.

g. Search the SLSB 442 to find the primed outbound storage buffer access list (SBAL) (shown as the buffer pointer 441) which points to the storage buffer access list element (SBALE) describing the packet of data to be moved to the target IP address.

h. Using the located SBAL, extract the destination IP address 244 from the outbound user buffer 443.

i. Use the IP address 244 to search the target queue hash table 320 to find the table entry 322 for the queue descriptor of the receive queue 220/445.

j. Obtain the inbound lock 432 to obtain exclusive serialization of the queue control 330 associated with the located target hash table entry 322.

k. The SLSB 447 of the receive queue 445 is searched to find an empty SBAL to receive the data.

l. Move the data in user buffer 443 of the send queue 440 to the user buffer 448 of the receiver queue 445 using internal millicode mechanism that overrides the normal restrictions on data moves between storage addresses in different LPAR partitions.

m. Update the SLSB 442 of the send queue 440 and the SLSB 447 of the receive queue 445. These updates are visible to the software and allows program manipulation of the send and receive queues 222 and 220.

n. Release the shared serialization lock 401.

o. Set a program initiative (I/O completion vector polling bytes—620a, 615a, and 612) for the partition that contains the receive queue 220 to indicate that new elements or data are available on the receive queue 220. Having been thus informed, software in the target partition may process the data in its receive queue 220. FIG. 10 illustrates one inbodiment of the present invention wherein such an initiative for an I/O event is established.

p. Algorithmically determine if I/O interrupt generation is required, and if so generate the interrupt.

It will be understood that in the present embodiment, steps b–p of the send operation are performed by hardware, making the performance of these steps very reliable and at hardware speed. However, these steps, or some portion of them, could be done in software, if desired. This invention may also be used to transfer data between multiple virtual servers within a single partition.

FIG. 10 illustrates a three tiered hierarchy 600 of I/O completion vectors 610, 611 and 612. At the very top of the hierarchy, is a single global summary byte 612. Byte 612 is polled by a dispatcher 605 serving the computer to see if attention is required by any of the devices 190 residing lower in the hierarchy. If top byte 612 is found to be set, then the next lower level or middle tier 611 is interrogated. The middle tier 611 includes vectors of multiple local summary bytes 615a–615n. Finally, the bottom tier 610 includes completion vectors 618a–618n which contain one byte 620a–620n per device. Devices 190 set these detailed completion vector bytes 620a–620n in the bottom tier 610 to inform the processor 130 of I/O completion events. There is one local summary byte 615a–615n for each completion vector 618a–618n respectively, with each completion vector 615a–615n representing multiple devices 190. The number of devices within a completion vector is processor dependent (for instance, based upon cache line size). In one embodiment, optimized processor dependent instructions are used to perform the scanning of the completion vector bytes.

Each device 190 is assigned a unique completion vector byte 620a–620n, its associated local summary byte 615a–615n, and the single global summary byte 612. The device 190 is totally unaware that the completion vector byte may be in close proximity with completion vector bytes assigned to other devices. This invention assumes that separate per-device "queues" 220 and 222 are used between the processor 130 and the I/O device 190 to contain the detailed status describing which of the pending I/O events have completed. This invention only deals with the initiative passing piece of I/O completion. The preferred implementation of this invention assumes that devices can atomically update host memory at a byte level of granularity, but the concepts would equally apply to any higher/lower level of atomicity.

To close serialization timing windows, the three levels 610, 611 and 612 of completion bytes must be set by the device 190 in a well defined order. Specifically, device 190 must first set its respective completion vector byte 620, followed by the completion vector's respective local summary byte 615, and finally the global summary byte 612. The processor 130 must reset these bytes in the reverse order. This may result in an over initiative condition (i.e. the processor thinks there is new work to be performed, when it has already processed that work during a previous completion vector scan).

Significant cache line contention on the global/local summary bytes (updated by the devices) can be avoided by having the devices first read the bytes before attempting to store into them. The update is only performed if the target byte is not already set. This will cause the summary bytes to effectively become read only, from the time that they are set by any one device to the time that they are reset as part of the dispatcher poll processing. The timing windows described above are all satisfied as long as the reads are implemented in the order described (low tier 610 to high 612).

Referring to FIG. 10, a process is established at 650 to determine which device or devices 190 need to be serviced by the dispatcher 605. At 652, the buffers are appended to the detailed I/O queue 220 or 222, as part of the send/receive operation. At 654, the device's completion vector 620a is set, whereupon it's summary byte 615a is set at 656, and the global byte 612 is set at 658, in low to high order. At 660, the dispatcher 605 polls the global summary byte 612 and finds it is set. At 662, the dispatcher 605 then interrogates the respective summary bytes 615a–615n, and finally at 664 interrogates the respective completion vectors 618a–618n, and their bytes 620a–620n to service the device 190, and resets the bytes in high to low order. The reset instructions must not complete until the updated bytes are made visible to the other processors in the system (i.e. out of L1 cache) in order to insure I/O impetus is never lost.

Since each device is assigned a unique lowest level completion vector byte, the control information describing the device can be easily obtained by maintaining a parallel vector of control block addresses. Specifically, once it is seen that completion vector byte 44 (for example) is set, that byte offset can be used as an index into an array of entries (each 4 or 8 bytes in length depending upon the addressing range), that contains the address of a control block that describes the device now known to be requiring attention.

The three tiered hierarchy of I/O completion vectors scales horizontally in addition to vertically. Specifically, the horizontal scaling allows a single hypervisor that supports multiple concurrent guest OS images within it (e.g. IBM's z/VM), to efficiently determine which guest requires dispatching to process the pending I/O initiative in the completion vectors. In this environment, the global summary byte is owned by the hypervisor, and each middle tier summary byte is owned by a unique guest OS. The hypervisor dispatcher then uses the middle tier summary byte to determine which guest the pending I/O initiative is targeted for. The devices storing into the I/O completion vectors are ignorant of this additional dispatching level.

Figure 11:
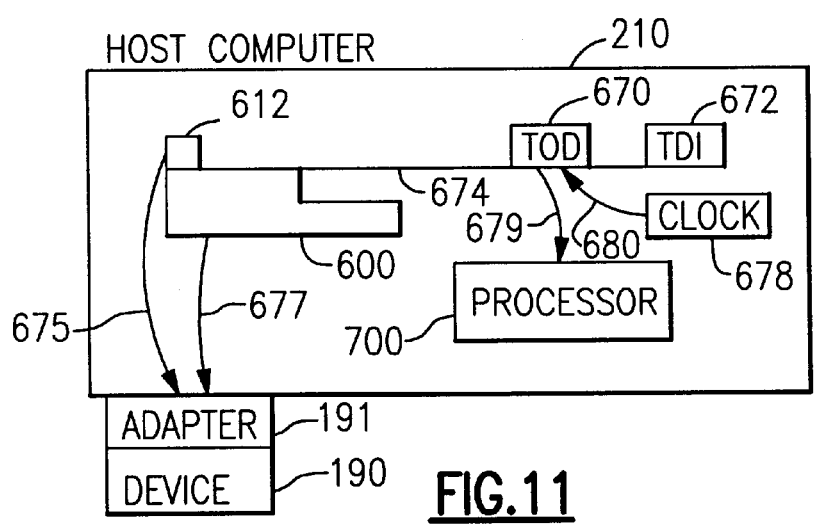
FIG. 11 is a schematic diagram of the hierarchy of FIG. 10 with a Time of Day (TOD) register, a Target Delay Interval (TDI) register, and a processor within a host computer for completion of I/O requests by devices.

FIG. 11 illustrates the host computer 210 having an OS which includes the processor 700 which executes dispatcher software 605 (see FIG. 10). As explained in connection with FIG. 10, the host computer 210 includes a heirarchy 600 whose highest level includes a global summary byte (GSB) 612. As explained, whenever a device 190 requires attention, the bytes in the hierarchy 600 are set from low order to high, until the GSB 612 is set. The host computer 210 also includes a Time-of-Day (TOD) register 670 in which is recorded the last time the GSB 612 was set, and a Target-Delay-Interval (TDI) register 672 for storing a target-delay-interval value specified by the OS. These two values are shared across all devices implementing the low level interrupt. In one preferred implementation, to minimize cache line accesses, these two registers 670 and 672 reside in the same cache line 674 as the GSB 612 itself. This allows for read-before-write activity for two purposes: first, to avoid heavy write access to that cache line 674; and second, to obtain both the last time the GSB 612 was set (possibly by another device 190), and the delay value in TDI register 672 that is to be enforced. Only the device 190 that sets the GSB 612 is responsible for storing the time-of-day value in the TOD register 670. All others should just perform the comparison with the current TOD, to determine if an interrupt is required.

Also included is a clock 678 for containing the current time-of-day value. When the operating system is initialized, the present time-of-day value is placed in the TOD register 670 as shown at 680, and a time delay interval value is placed in the TDI register 672. The devices 190 are then associated with individual vectors 620a–620n as represented by 675 and previously explained. As represented by 677, as part of completing send/receive I/O operations, each device reads the global byte cache line 674. If the GSB 612 is set, the device subtracts the last time-of-day value in the TOD register 670 from the current time-of-day value, and, if the result is greater than the target-delay-interval value in the TDI register 672, a low level interrupt is sent to the I/O processor 700 of the host computer 210 by hardware of a device adapter 191 which connects the device 190 to the computer 210, as represented by 679. It will be understood that the device adapter 191 may be a separate apparatus, or could be built into the device 190, as may be desired. If the device 190 finds the GSB 612 reset, the device 190 places the current time-of-day value in the TOD register 670, and completes the I/O operation with only the completion vectors set 600.

Figure 12:
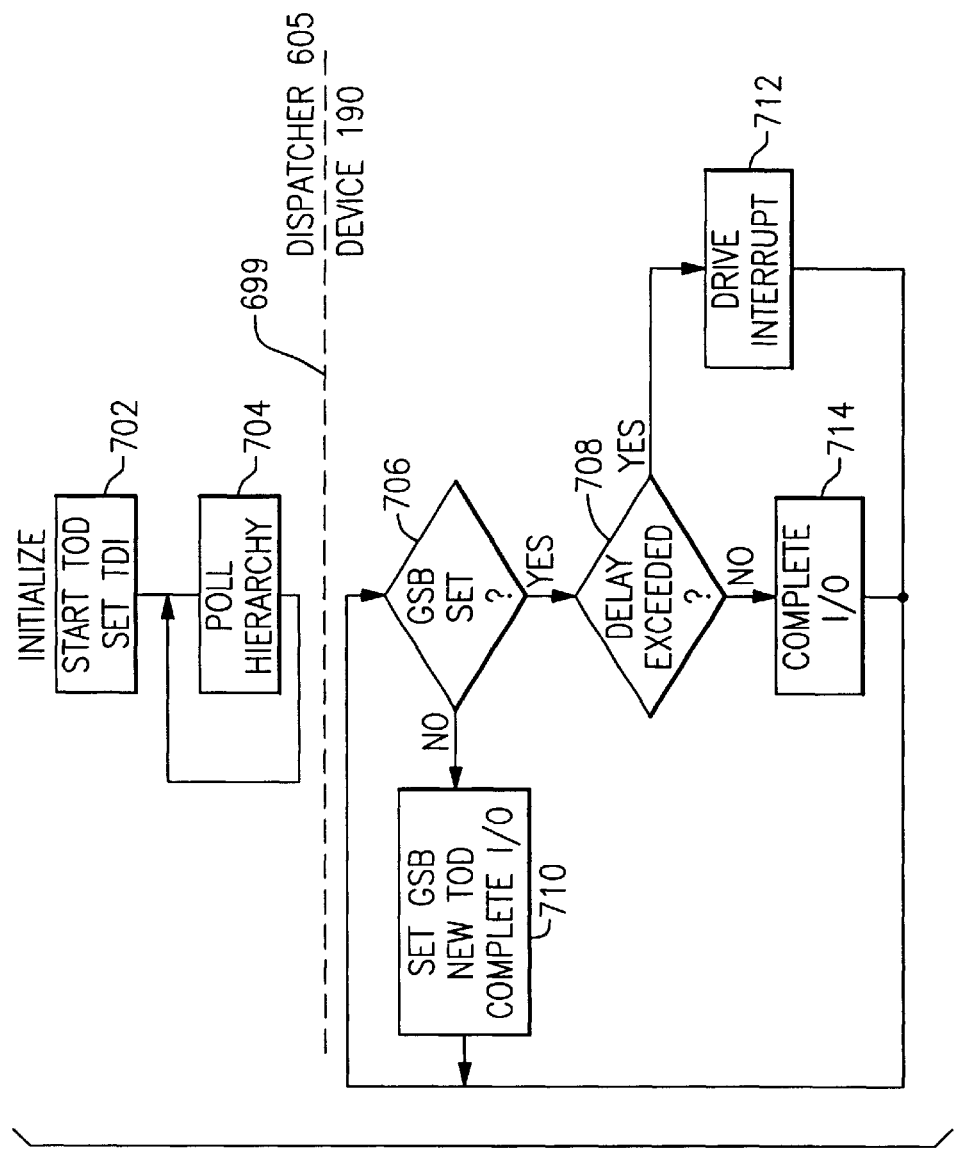
FIG. 12 is a flow diagram showing the cooperation between the dispatcher of the OS and the devices.

FIG. 12 is a flow chart showing the tasks performed by the dispatcher 605 of the operating system above the line 699, and those tasks performed by each device 190, shown below the line 699. At 702, the dispatcher 605 initializes the system as previously described, which includes placing the current time-of-day value in the TOD register 670, and placing the target-delay-interval in the TDI register 672. At 704, the dispatcher 605 then begins to poll the hierarchy 600, as previously described, to locate devices that need attention.

At 706, during a send/receive I/O operation, a device 190 checks to determine if the GSB 612 is set. If the GSB 612 is set, a check is made at 708 to determine if the delay interval is exceeded. If the delay is exceeded at 708, the device adapter 191 drives a low level interrupt to the processor 700 of the host computer 210 without modifying the time-of-day value when the GSB was originally set, thus allowing for the full delay to be calculated when the GSB is finally reset. This interrupt is low cost because it only causes the processor 700 to poll the completion vectors. No detailed information is queued as to which device requires attention, therefore the amount of serialization/complexity required to drive the interrupt is significantly reduced. Since each device is assigned a unique lowest level completion vector byte, the control information describing the device can be easily obtained by maintaining a parallel vector of control block addresses. Specifically, once it is seen that completion vector byte 44 (for example) is set, that byte offset can be used as an index into an array of entries (each 4 or 8 bytes in length depending upon the addressing range), that contains the address of a control block that describes the device now known to be requiring attention. The interrupt also handles all devices needing attention at that time. Thus, interrupts from multiple sources are coalesced into a single notification event. This allows even the low cost interrupt to be amortized across multiple device completions.

If the GSB 612 is reset at 706, the device 190 sets the GSB 612, places the current time-of-day value in the TOD register 670 at 710 and completes the I/O operation with only the completion vectors set 600. If the GSB is set at 706 but the delay is not exceeded at 708, then the I/O operation is completed at 714 with only the completion vectors 600 set. It will be understood that new TOD values and resetting the GSB occurs during the complete I/O step.

It will be understood that registering of I/O requests by each of the devices 190 in the hierarchy 600 is done independently from the polling of the hierarchy 600 by the dispatcher, and that the intelligent interrupt of the present invention is done by each device 190 in cooperation with but independent from the polling of the hierarchy 600 by the dispatcher 605.

If no completion occurs after the delay interval has been exceeded, but completions are pending, then a last resort timer is required to force the dispatcher 605 to perform the poll operation, even though it was never explicitly driven to do so.

The dispatcher 605 includes a program (FIGS. 13 and 14) which calculates the TDI based on an algorithm which takes into account workload history. The overall model is to accumulate delay intervals (from time GSB is set to the time it is reset) over some number of samples. Once the threshold of samples has been reached, then the program makes a decision. The decision processing calculates the average interval since the last decision. If the average interval is within the target range, then the program requires some level of stability in getting good samples, before taking any action. If a single average interval is bad, then the program immediately zeros the delay interval, thereby resorting to interrupts only. The level of stability before setting a non-zero delay interval depends upon if the most recent last decisions to set a non-zero delay, turned out to be the wrong decision (i.e. delay probing non-zero delays if they haven't worked in the recent past)

Figure 13:
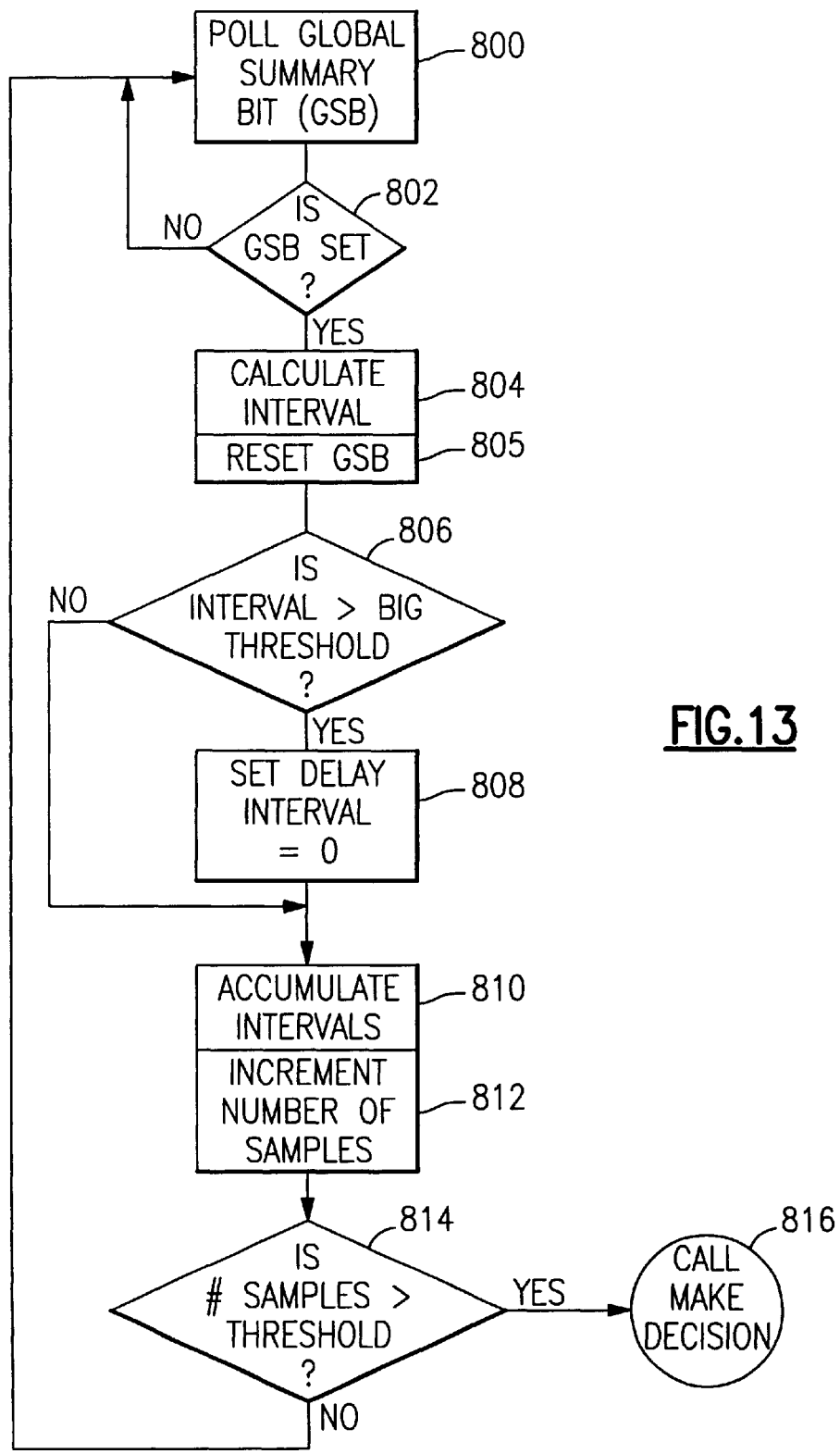
FIG. 13 is a flow chart of the dispatcher program for an algorithm for determining the TDI value based upon workload heuristics.

The program processing of Dispatcher 605 is shown in FIG. 13 and is as follows:

```
800 Poll Global Summary Byte
802 If (set) Then
    804 Calculate interval from time GSB was set to the Current TOD
    805 Reset GSB 805
    806 If (interval > BigThreshold) Then
        808 Force a "bad" decision cycle (i.e. cause DelayInterval to go
            to zero, etc.)
    End
    810 Accumulate intervals across multiple samples
    812 Increment the number of samples
    814 If (# of samples is above a decision making threshold) Then
        816 Call MakeDecision
    End
End
```

Figure 14:
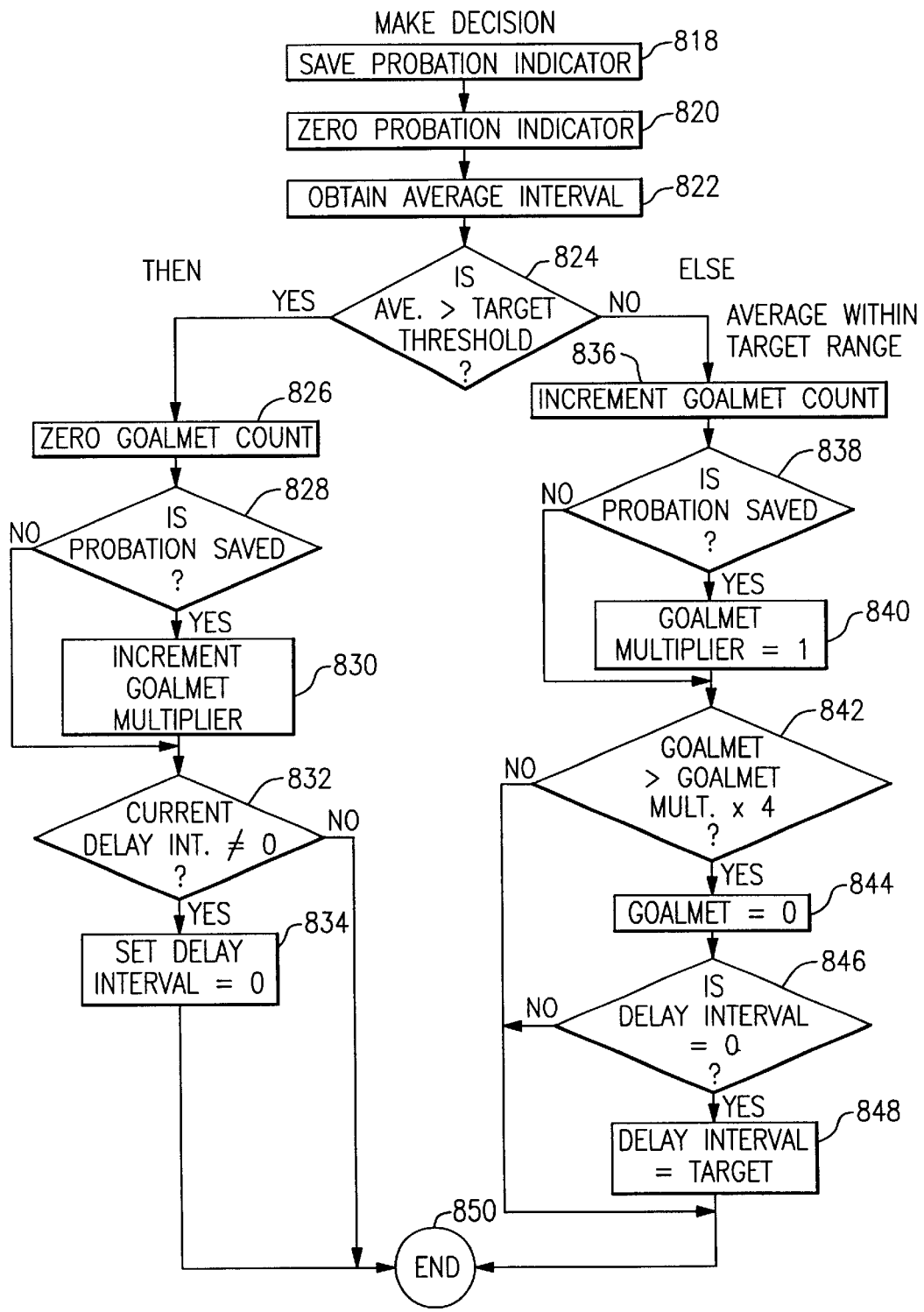
FIG. 14 is a flow chart of the MakeDecision subroutine of the dispatcher program of FIG. 13.

The MakeDecision subroutine of FIG. 13 is shown in FIG. 14 and is as follows:

```
818 Save Probation indicator
820 Zero Probation indicator
822 Divide accumulated intervals by # of samples to obtain
    average interval
824 If (average > target threshold) Then
    826 Zero GoalMet count
    828 If (Saved probation is true) Then
        830 Increment GoalMetMultiplier (capped at some value)
    End
    832 If (Current DelayInterval ^ = 0) Then
        834 Set DelayInterval to zero
    End
Else (average is within target range)
    836 Increment GoalMet count
    838 If (Saved probation is true) Then
        840 GoalMetMultiplier =1 (forget previous bad history,
            good sample after probation)
    End
    842 If (GoalMet > GoalMetMultiplier *4) Then
        844 GoalMet = 0
        846 If (DelayInterval =0) Then
            848 Set DelayInterval to target delay interval constant
        End
    End
850 End
```

A level of collaboration between the computer hypervisor implementing the floating CPU partitioning, and the devices is required. This collaboration involves the hypervisor proactively informing the devices when the target partition is no longer active on any CPU (i.e. dispatcher polling is not occurring for that partition). This proactive notification would cause the devices to generate an interrupt immediately, independent of the current delay value calculation.

Logical partitioning implementations require the hypervisor to track which CPUs are all allocated to a given logical partition for a number of reasons. One such reason is to be able to detect when the last CPU is removed from a logical partition, so that the hypervisor can inform the hardware that interrupts targeted for that partition must now be handled by the hypervisor instead of the logical partition itself. In the preferred implementation a hook is added to this interrupt redirection processing, to proactively inform devices that an immediate interrupt will be required to cause the activation of the target partition. Then as part of processing that interrupt, or the logical partition performing a dispatcher polling activity (which ever comes first), the hypervisor notice is reset.

Figure 15:
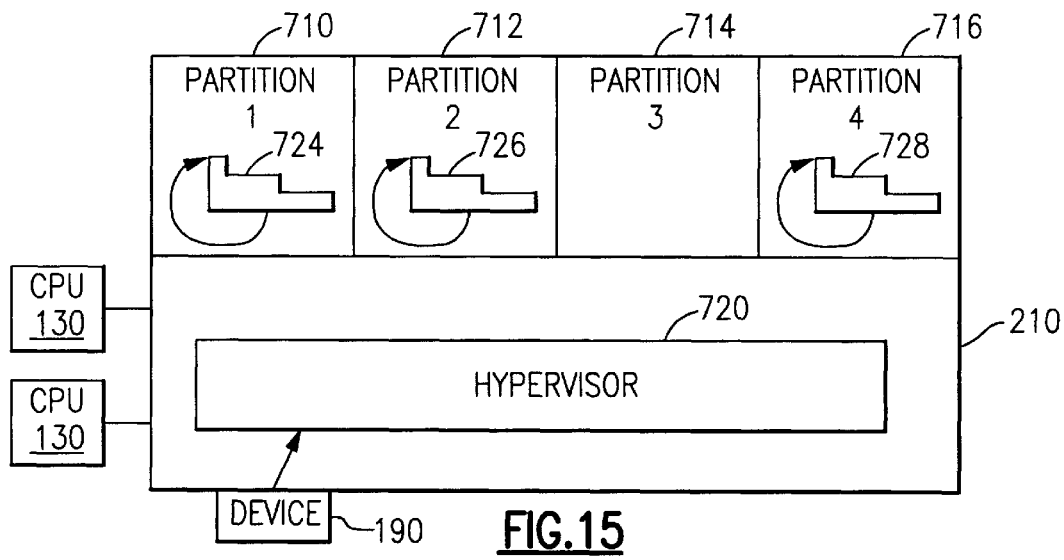
FIG. 15 is a diagram illustrating a computer having multiple partitions, wherein interrupts of one of the partitions is under the control of a hypervisor.

Turning now to FIG. 15, the computer 210 is shown divided, for example, into four partitions, 710, 712, 714, and 716, as is well known. A hypervisor 720 oversees the partitions, and assigns which of the CPUs 130 run in each of the partitions, as is well known. In the example shown in FIG. 13, partitions 1, 2 and 4 (710, 712 and 716) have CPUs assigned which perform the polling previously described and as represented by 724, 726, and 728. As an example, partition 3 (714) has had its CPU removed. In this case, the hypervisor 720 informs the hardware that I/O interrupts will be handled by the hypervisor 720 rather than using the polling techniques described. Thus, when a device 190 requests an I/O operation with partition 3 (714) the hypervisor 720 handles an immediate interrupt, as will be described.

Figure 16:
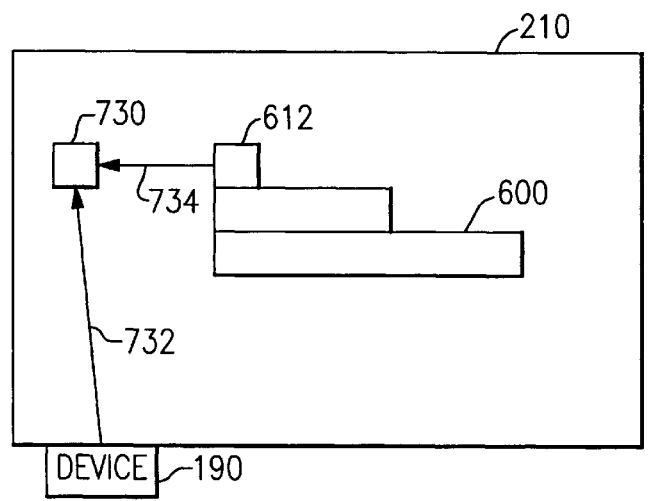
FIG. 16 is a diagram illustrating the use of an override bit for informing devices that immediate interrupts will be handled by the hypervisor of FIG. 15.

Referring to FIG. 16, each partition of the computer 210 has an override bit 730 associated with the GSB 612 for that partition. When the partition does not have a CPU assigned, or when a CPU is removed from the partition, the hypervisor 720 sets the override bit 730 to inform any devices 190 requesting an I/O operation with the partition as shown at 732, that an immediate interrupt should be handled by the hypervisor 720. When the hypervisor 720 processes the interrupt, or when a CPU is reassigned to the partition and a dispatcher performs a polling activity for that partition, whichever occurs first, the override bit is reset as shown at 734.

It will be understood that even though the example of FIG. 14 is with a machine divided into four partitions, the override bit will be the same for a machine divided into any number of partitions, or in a machine not divided into partitions where it is desirable to notify the hardware that an immediate interrupt should be taken rather than polling the hierarchy.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. An apparatus comprising:
    a processor handling an I/O request in an I/O operation;
    main storage controlled by said processor for storing data;
    one or more I/O devices for sending data to or receiving data from said main storage in the I/O operation;
    a summary register for registering I/O requests for service by any one or more of said devices;
    a dispatcher for polling said summary register to determine if an I/O request is outstanding, if the polling determines an I/O request is outstanding, the I/O request is serviced and the summary register is reset;
    a target delay register having a target delay value set to a predetermined value;
    a program in said dispatcher calculating a delay value responsive to the workload of the processor in handling I/O requests, if the calculated delay value is greater than expected, setting the target delay value to a minimum value; and
    an adapter connected between said device and said processor driving an interrupt of said processor if the target delay value time period is exceeded between registering and resetting an I/O requests.

2. The apparatus of claim 1 wherein said main storage is divided into multiple partitions, each partition having an operating system image, and said dispatcher calculates the delay value responsive to I/O requests on a target operating system image.

3. The apparatus of claim 1 wherein said program calculates the delay value based upon workload heuristics to detect I/O completion patterns.

4. The apparatus of claim 1 wherein the minimum value is zero.

5. The apparatus of claim 1 wherein said program includes a check which sets the delay value to a nonzero value, thereby allowing interrupts to be amortized across multiple completions of said I/O requests.

6. The apparatus of claim 1 wherein said summary register is reset to show no outstanding I/O requests by said dispatcher as part of said I/O operations, and said program maintains an average delay that is incurred for the times between when the summary register registers an I/O request and the time said summary register is reset by said dispatcher, said program having a check for causing interrupts to be driven when said average exceeds a target.

7. An apparatus for use with a data processing system having a processor handling an I/O request in an I/O operation, main storage controlled by said processor for storing data and one or more I/O devices for sending data to or receiving data from said main storage in the I/O operation; said apparatus comprising:
    a summary register for registering I/O requests for service by any one or more of said devices;
    a dispatcher for polling said summary register to determine if an I/O request is outstanding, if the polling determines an I/O request is outstanding, the I/O request is serviced and the summary register is reset;
    a target delay register having a target delay value set to a predetermined value;
    a program in said dispatcher calculating a delay value responsive to the workload of the processor in handling I/O requests, if the calculated delay value is greater than expected, setting the target delay value to a minimum value; and
    an adapter connected between said device and said processor driving an interrupt of said processor if the target delay value time period is exceeded between registering and resetting an I/O request.

8. The apparatus of claim 7 wherein said main storage is divided into multiple partitions, each partition having an operating system image, and said dispatcher calculates a delay value responsive to I/O requests on a target operating system image.

9. The apparatus of claim 7 wherein said program calculates the delay value based upon workload heuristics to detect I/O completion patterns.

10. The apparatus of claim 7 wherein said program includes a check which sets the delay value to zero when the calculated delay value is consistently not meeting a target delay.

11. The apparatus of claim 7 wherein the minimum value is zero.

12. The apparatus of claim 7 wherein said summary register is reset to show no outstanding I/O requests by said dispatcher as part of said I/O operations, and said program maintains an average delay that is incurred for the times between when the summary register registers an I/O request and the time said summary register is reset by said dispatcher, said program having a check for causing interrupts to be driven when said average exceeds a target.

13. A method for use with a data processing system having a processor handling an I/O request in an I/O operation, main storage controlled by said processor for storing data and one or more I/O devices for sending data to or receiving data from said main storage in the I/O operation; said method comprising the steps of:
    registering in a summary register, I/O requests for service by any one or more of said devices;
    polling said summary register to determine if an I/O request is outstanding, wherein if the polling determines an I/O request is outstanding, the I/O request is serviced and the summary register is reset;
    setting a target delay value in a target delay register to a predetermined value;
    calculating a delay value responsive to the workload of the processor in handling I/O requests, wherein if the calculated delay value is greater than expected, setting the target delay value to a minimum value; and
    driving an interrupt of said processor if the target delay value time period is exceeded between registering and resetting an I/O request.

14. The method of claim 13 wherein said main storage is divided into multiple partitions, each partition having an operating system image, and said method further comprises calculating a delay value responsive to I/O requests on a target operating system image.

15. The method of claim 13 wherein said calculating of said the delay value is based upon workload heuristics to detect I/O completion patterns.

16. The method of claim 13 further comprising setting the delay value to zero when the calculated delay value is consistently not meeting a target delay.

17. The method of claim 13 further comprising setting the delay value to a nonzero value, thereby allowing interrupts to be amortized across multiple completions of said I/O requests.

18. The method of claim 13 wherein said summary register is reset during I/O operations to show no outstanding I/O requests, and said method further comprises maintaining an average delay that is incurred for the times between when the summary register registers an I/O request and the time said summary register is reset, said program having a check for causing interrupts to be driven when said average exceeds a target.

19. A program product usable with a data processing system having a processor handling an I/O request in an I/O operation, main storage controlled by said processor for storing data and one or more I/O devices for sending data to or receiving data from said main storage in the I/O operation; said program product comprising:

a computer readable medium having recorded thereon computer readable program code means for performing the method comprising:

registering in a summary register, I/O requests for service by any one or more of said devices;

polling said summary register to determine if an I/O request is outstanding, wherein if the polling determines an I/O request is outstanding, the I/O request is serviced and the summary register is reset;

setting a target delay value in a target delay register to a predetermined value;

calculating a delay value responsive to the workload of the processor in handling I/O requests, wherein if the calculated delay value is greater than expected, setting the target delay value to a minimum value; and driving an interrupt of said processor if the target delay value time period is exceeded between registering and resetting an I/O request.

20. The program product of claim 19 wherein said main storage is divided into multiple partitions, each partition having an operating system image, and said method further comprises calculating a delay value responsive to I/O requests on a target operating system image.

21. The program product of claim 19 wherein said method further comprises calculating of said the delay value based upon workload heuristics to detect I/O completion patterns.

22. The program product of claim 19 wherein said method further comprises setting the delay value to zero when the calculated time delay is consistently not meeting a target delay.

23. The program product of claim 19 wherein said method further comprises setting the delay value to a nonzero value, thereby allowing interrupts to be amortized across multiple completions of said I/O requests.

24. The program product of claim 19 wherein said summary register is reset during I/O operations to show no outstanding I/O requests, and said method further comprises maintaining an average delay that is incurred for the times between when the summary register registers an I/O request and the time said summary register is reset, said program having a check for causing interrupts to be driven when said average exceeds a target.

25. The apparatus according to claim 1 wherein said summary register comprises any one of one or more fields, each field capable of representing one I/O device; an aggregating field representing a plurality of devices or a plurality of aggregating fields, each field representing a plurality of devices.

26. The apparatus according to claim 7 wherein said summary register comprises any one of one or more fields, each field capable of representing one I/O device; an aggregating field representing a plurality of devices or a plurality of aggregating fields, each field representing a plurality of devices.

27. The apparatus according to claim 13 wherein said summary register comprises any one of one or more fields, each field capable of representing one I/O device; an aggregating field representing a plurality of devices or a plurality of aggregating fields, each field representing a plurality of devices.

28. The apparatus according to claim 19 wherein said summary register comprises any one of one or more fields, each field capable of representing one I/O device; an aggregating field representing a plurality of devices or a plurality of aggregating fields, each field representing a plurality of devices.

* * * * *